United States Patent
Guo et al.

(10) Patent No.: US 10,187,661 B2
(45) Date of Patent: Jan. 22, 2019

(54) METHOD AND APPARATUS FOR CONTEXT ADAPTIVE BINARY ARITHMETIC CODING OF SYNTAX ELEMENTS

(71) Applicant: HFI INNOVATION INC., Zhubei, Hsinchu County (TW)

(72) Inventors: Mei Guo, San Jose, CA (US); Shan Liu, San Jose, CA (US); Shaw-Min Lei, Hsinchu County (TW)

(73) Assignee: HFI INNOVATION INC., Zhubei, Hsinchu County (TW)

(*) Notice: Subject to any disclaimer, the term of this patent is extended or adjusted under 35 U.S.C. 154(b) by 109 days.

(21) Appl. No.: 14/371,437

(22) PCT Filed: Dec. 13, 2012

(86) PCT No.: PCT/CN2012/086536
§ 371 (c)(1),
(2) Date: Jul. 10, 2014

(87) PCT Pub. No.: WO2013/107230
PCT Pub. Date: Jul. 25, 2013

(65) Prior Publication Data
US 2014/0328396 A1  Nov. 6, 2014

(30) Foreign Application Priority Data
Jan. 16, 2012  (WO) ............... PCT/CN2012/070428

(51) Int. Cl.
*H04N 7/12* (2006.01)
*H04N 11/02* (2006.01)
(Continued)

(52) U.S. Cl.
CPC ........... *H04N 19/70* (2014.11); *H04N 19/124* (2014.11); *H04N 19/91* (2014.11)

(58) Field of Classification Search
CPC ....... H04N 19/70; H04N 19/124; H04N 19/91
See application file for complete search history.

(56) References Cited

U.S. PATENT DOCUMENTS 9,299,120 B2    3/2016  Zou et al.
9,888,261 B2 *  2/2018  Kim ...................... H04N 19/91
(Continued)

FOREIGN PATENT DOCUMENTS

CN    101771879 A     7/2010
CN    101636761       1/2011
(Continued)

OTHER PUBLICATIONS

Chien, W.J., et al.; "Context reduction for CABAC"; Joint Collaborative Team on Video Coding (JCT-VC) of ITU-T SG16 WP3 and ISP/IEC JTC1/SC29/WG11 JCTVC-G718; Nov. 2011; pp. 1-10.
(Continued)

*Primary Examiner* — Jeremiah C Hallenbeck-Huber
*Assistant Examiner* — Boubacar Abdou Tchoussou
(74) *Attorney, Agent, or Firm* — Oblon, McClelland, Maier & Neustadt, L.L.P.

(57) ABSTRACT

In a method and apparatus for context-adaptive binary arithmetic coding (CABAC) of a syntax element, the bin string corresponding to the syntax element is processed by context-adaptive arithmetic coding with a reduced number of contexts using the bin-level bypass mode, bin-level context sharing, or both. The syntax element belongs to a group comprising merge_idx, ref_idx_1c/ref_idx_10/ref_idx_11, pred_type, and cu_qp_delta. In one embodiment, the syntax element corresponds to merge_idx and three bins of the bin string with bin indices corresponding to 1, 2 and 3 are coded in the bin by-pass mode. In another embodiment, the syntax element corresponds to ref_idx_1c/ref_idx_10/ref_idx_11 and one or more bins of the bin string with bin
(Continued)

indices larger than 1 for larger than 2 are coded in the bin bypass mode.

2 Claims, 3 Drawing Sheets

(51) Int. Cl.
*H04N 11/04* (2006.01)
*H04N 19/70* (2014.01)
*H04N 19/124* (2014.01)
*H04N 19/91* (2014.01)

(56) References Cited

U.S. PATENT DOCUMENTS

| | | | |
|---|---|---|---|
| 9,888,263 B2* | 2/2018 | Kim | H04N 19/91 |
| 2009/0168868 A1 | 7/2009 | Jahanghir | |
| 2012/0014454 A1* | 1/2012 | Budagavi | H04N 19/91 |
| | | | 375/240.16 |
| 2012/0300839 A1* | 11/2012 | Sze | H04N 19/91 |
| | | | 375/240.12 |
| 2013/0027230 A1* | 1/2013 | Marpe | H03M 7/4006 |
| | | | 341/107 |
| 2013/0114671 A1* | 5/2013 | Chien | H03M 7/4018 |
| | | | 375/240.02 |
| 2013/0136375 A1* | 5/2013 | Sasai | G06T 9/004 |
| | | | 382/238 |
| 2013/0170553 A1* | 7/2013 | Chen | H04N 19/52 |
| | | | 375/240.16 |
| 2013/0177069 A1* | 7/2013 | Sze | H04N 19/00121 |
| | | | 375/240.02 |
| 2013/0202026 A1* | 8/2013 | Fang | H04N 19/91 |
| | | | 375/240.02 |
| 2014/0140400 A1* | 5/2014 | George | H04N 19/52 |
| | | | 375/240.12 |
| 2014/0177707 A1* | 6/2014 | George | H04N 19/52 |
| | | | 375/240.03 |
| 2014/0198841 A1* | 7/2014 | George | H04N 19/52 |
| | | | 375/240.03 |

FOREIGN PATENT DOCUMENTS

| | | |
|---|---|---|
| CN | 101951516 A | 1/2011 |
| CN | 102256125 A | 11/2011 |
| WO | WO 2011/002914 | 1/2011 |

OTHER PUBLICATIONS

Sze, V.; "BOG report on context reduction for CABAC", Joint Collaborative Team on Video Coding (JCT-VC) of ITU-TSG16 WP3 and ISO/IEC JTC1/SC29/WG11 JCTVC-F746; Jul. 2011; pp. 1-8.

Sze, V., et al.; "Parallel Context Processing of Coefficient Level;" Joint Collaborative Team on Video Coding (JCT-VC) of ITU-T SG16 WP3 and ISO/IEC JTC1/SC29/WG11; Jul. 2011; pp. 1-5.

Seregin, V., et al.; "Utilisation of CABAC equal probability mode for intra modes coding;" Joint Collaborative Team on Video Coding (JCT-VC) of ITU-T SG16 WP3 and ISO/IEC JTC1/SC29/WG11; Jul. 2011; pp. 1-4.

Sasai, H., et al.; "Modified MVD coding for CABAC;" Joint Collaborative Team on Video Coding (JCT-VC) of ITU-T SG16 WP3 and ISO/IEC JTC1/SC29/WG11; Jul. 2011; pp. 1-7.

Office Action dated May 30, 2018 in German Patent Application No. 11 2012 005 164.5, 7 pages.

Marpe, D. et al. "Context-Based Adaptive Binary Arithmetic Coding in the H.264/AVC Video Compression Standard", IEEE Transactions on Circuits and Systems for Video Technology, vol. 13, No. 7, Jul. 2003, pp. 620-636.

\* cited by examiner

METHOD AND APPARATUS FOR CONTEXT ADAPTIVE BINARY ARITHMETIC CODING OF SYNTAX ELEMENTS

CROSS REFERENCE TO RELATED APPLICATIONS

The present invention claims priority to PCT Patent Application, Serial No. PCT/CN2012/070428, filed Jan. 16, 2012, entitled "CABAC Simplification for Some Syntax Elements". The PCT Patent Application is hereby incorporated by reference in its entirety.

TECHNICAL FIELD

The present invention relates to video coding or video processing. In particular, the present invention relates to CABAC coding of syntax elements with reduced complexity in High Efficiency Video Coding (HEVC).

BACKGROUND

The arithmetic coding is known as an efficient data compressing method and is widely used in coding standards, such as JBIG, JPEG2000, H.264/AVC, and High-Efficiency Video Coding (HEVC). In H.264/AVC JVT Test Model (JM) and HEVC Test Model (HM), Context-Based Adaptive Binary Arithmetic Coding (CABAC) is adopted as the entropy coding tool for various syntax elements in the video coding system.

FIG. 1 illustrates an example of CABAC encoder 100 which includes three parts: Binarization 110, Context Modeling 120, and Binary Arithmetic Coding (BAC) 130. In the binarization step, each syntax element is uniquely mapped into a binary string (also called bin or bins in this disclosure). In the context modeling step, a probability model is selected for each bin. The corresponding probability model may depend on previously encoded syntax elements, bin indices, side information, or any combination of the above. After the binarization and the context model assignment, a bin value along with its associated context model is provided to the binary arithmetic coding engine, i.e., the BAC 130 block in FIG. 1. The bin value can be coded in two coding modes depending on the syntax element and bin indices, where one is the regular coding mode, and the other is the bypass mode. The bins corresponding to regular coding mode are referred to as regular bins and the bins corresponding to bypass coding mode are referred to as bypass bins in this disclosure. In the regular coding mode, the probability of the Most Probable Symbol (MPS) and the probability of the Least Probable Symbol (LPS) for BAC are derived from the associated context model. In the bypass coding mode, the probability of the MPS and the LPS are equal. In CABAC, the bypass mode is introduced to speed up the encoding process.

In HEVC Test Model Version 5.0 (HM-5.0), syntax elements such as merge_flag (related to the merge flag for a coding unit, i.e., CU), merge_idx (related to the merge index), ref_idx_lc/ref_idx_l0/ref_idx/l1 (related to the reference picture index), pred_type (related to the prediction type), and cu_qp_delta (related to delta of quantization parameter QP for a CU) are coded using CABAC. Syntax element merge_flag, which has a value equal to either 0 or 1, has only one bin and is coded using one context. The bin strings of merge_idx, ref_idx_lc/ref_idx l0/ref_idx/l1, and pred_type are shown in Table 1, Table 2 and Table 3 respectively. For merge_idx, pred_type and ref_idx_lc/ref_idx_l0/ref_idx/l1, one context is used for each bin. For ref_idx_lc/ref_idx l0/ref_idx 11, if the maximum value of ref_idx_lc/ref_idx_l0/ref_idx/l1 is larger than 3, the additional bins share the same context as the bin with binIdx equal to 2. For cu_qp_delta, the bin string is specified by a process equivalent to the following pseudo-code. The value of cu_qp_delta is denoted as synVal. For bin 0 (i.e., binIdx=0), the bin value is associated with the condition regarding whether abs(synVal) is equal to 0 or greater than 0 as shown in the pseudo code. When bin 0 has a value of 1, one or more additional bins are used to represent the value of delta QP. In the pseudo code, parameter QpBdOffsetY is recited due to specific data representation of delta QP used in HM-5.0 and QpBdOffsetY is related to bit depth of underlying video data.

TABLE 1

Bin string of merge_idx in HM5.0

| Value | Bin string | | | |
|---|---|---|---|---|
| 0 | 0 | | | |
| 1 | 1 | 0 | | |
| 2 | 1 | 1 | 0 | |
| 3 | 1 | 1 | 1 | 0 |
| 4 | 1 | 1 | 1 | 1 |
| binIdx | 0 | 1 | 2 | 3 |

TABLE 2

Bin string of ref_idx_lc/ref_idx_l0/ref_idx_l1 in HM5.0

| Value | Bin string | | | | | | |
|---|---|---|---|---|---|---|---|
| 0 | 0 | | | | | | |
| 1 | 1 | 0 | | | | | |
| 2 | 1 | 1 | 0 | | | | |
| 3 | 1 | 1 | 1 | 0 | | | |
| ... | ... | ... | ... | ... | ... | | |
| N − 1 | 1 | 1 | 1 | 1 | | 1 | 0 |
| N | 1 | 1 | 1 | 1 | ... | 1 | 1 |
| binIdx | 0 | 1 | 2 | 3 | ... | N − 2 | N − 1 |

TABLE 3

Bin string of pred_type for inter blocks in HM5.0

| | | | | Bin string | | |
|---|---|---|---|---|---|---|
| | | | | | cLog2CUSize = = Log2MinCUSize | |
| Slice type | Value of pred_type | PredMode | PartMode | cLog2CUSize > Log2MinCUSize | cLog2CUSize = = 3 && !inter_4x4_enabled_flag | cLog2CUSize > 3 \|\| inter_4x4_enabled_flag |
| I | 0 | MODE_INTRA | PART_2Nx2N | — | 1 | 1 |
| | 1 | MODE_INTRA | PART_NxN | — | 0 | 0 |

TABLE 3-continued

Bin string of pred_type for inter blocks in HM5.0

| Slice type | Value of pred_type | PredMode | PartMode | cLog2CUSize > Log2MinCUSize | | | | | cLog2CUSize == 3 && !inter_4x4_enabled_flag | | | cLog2CUSize > 3 \|\| inter_4x4_enabled_flag | | | |
|---|---|---|---|---|---|---|---|---|---|---|---|---|---|---|---|
| P/B | 0 | MODE_INTER | PART_2Nx2N | 0 | 1 | | | | 0 | 1 | | 0 | 1 | | |
| | 1 | MODE_INTER | PART_2NxN | 0 | 0 | 1 | 1 | | 0 | 0 | 1 | 0 | 0 | 1 | |
| | 2 | MODE_INTER | PART_Nx2N | 0 | 0 | 0 | 1 | | 0 | 0 | 0 | 0 | 0 | 0 | 1 |
| | 4 | MODE_INTER | PART_2NxnU | 0 | 0 | 1 | 0 | 0 | — | | | — | | | |
| | 5 | MODE_INTER | PART_2NxnD | 0 | 0 | 1 | 0 | 1 | — | | | — | | | |
| | 6 | MODE_INTER | PART_nLx2N | 0 | 0 | 0 | 0 | 0 | — | | | — | | | |
| | 7 | MODE_INTER | PART_nRx2N | 0 | 0 | 0 | 0 | 1 | — | | | — | | | |
| | 3 | MODE_INTER | PART_NxN | — | | | | | — | | | 0 | 0 | 0 | 0 |
| | 4 | MODE_INTRA | PART_2Nx2N | 1 | | | | | 1 | 1 | | 1 | 1 | | |
| | 5 | MODE_INTRA | PART_NxN | — | | | | | 1 | 0 | | 1 | 0 | | |
| binIdx | | | | 0 | 1 | 2 | 3 | 4 | 0 | 1 | 2 | 0 | 1 | 2 | 3 |

Pseudo Code for Bin String Generation of Cu_Qp_Delta:

```
absV = abs( synVal )
if( absV == 0 ){
    put( 0 ) ------------------------------------------------binIdx = 0
} else {
    put( 1 ) ------------------------------------------------binIdx = 0
    signV = ( synVal > 0 ) ? 0 : 1
    put( signV )
    cMax = 24 + ( QpBdOffsetY >> 1 ) + signV
    cNum = absV − 1
    absVGreaterThan1Flag = ( absV == 1 ) ? 0 : 1
    put( absVGreaterThan1Flag ) -------------------------binIdx = 1
    if( absVGreaterThan1Flag ){
        while( cNum-- )
            put( 1 ) ----------------------------------binIdx = 2......
        if( cMax > absV − 1 )
            put( 0 )
    }
}
```

The contexts used for the bin string are also indicated in the above pseudo code. The first two bins of cu_qp_delta (i.e., binIdx=0 and 1) use two separate contexts for each bin, while other bins (i.e., binIdx≥2) share one common context. When a bin is coded using contexts, it requires additional memory and also results in higher complexity at both encoder and decoder sides. Therefore, it is desirable to reduce the number of contexts required.

SUMMARY

A method and apparatus for context-adaptive arithmetic coding (CABAC) of a syntax element are disclosed. The method comprises receiving a syntax element and converting the syntax element into a bin string. The context-adaptive arithmetic coding is then applied to the bin string with a reduced number of contexts using a bin-level bypass mode, bin-level context sharing, or a combination of the bin-level bypass mode and said bin-level context sharing. The syntax element belongs to a group comprising merge_idx, ref_idx_1c/ref_idx_10/ref_idx_11, pred_type, and cu_qp_delta. In one embodiment, the syntax element corresponds to merge_idx and at least one bin of the bin string is coded in the bin-level bypass mode. For example, three bins of the bin string with bin indices corresponding to 1, 2 and 3 are coded in the bin bypass mode and the bin index starts with 0. Alternatively, at least two bins of the bin string of merge_idx share a common context. For example, three bins of the bin string with bin indices corresponding to 1, 2 and 3 share a common context. In another embodiment, the syntax element corresponds to ref_idx_1c/ref_idx_10/ref_idx_11 and at least one bin of the bin string is coded in the bin-level bypass mode. For example, one or more bins of the bin string with bin indices larger than 1 or larger than 2 are coded in the bin bypass mode. Alternatively, one or more bins of the bin string with bin indices larger than 1 share a common context.

Using the bin-level bypass mode and bin-level context sharing for reducing the number of contexts can be applied in multiple instances or applied jointly. For example, at least one bin of the bin string can be coded in the bin-level bypass mode and at least two bins of the bin string may share a common context. In another example, at least two first bins of the bin string share a first common context and at least two second bins of the bin string share a second common context.

DETAILED DESCRIPTION

Figure 1:
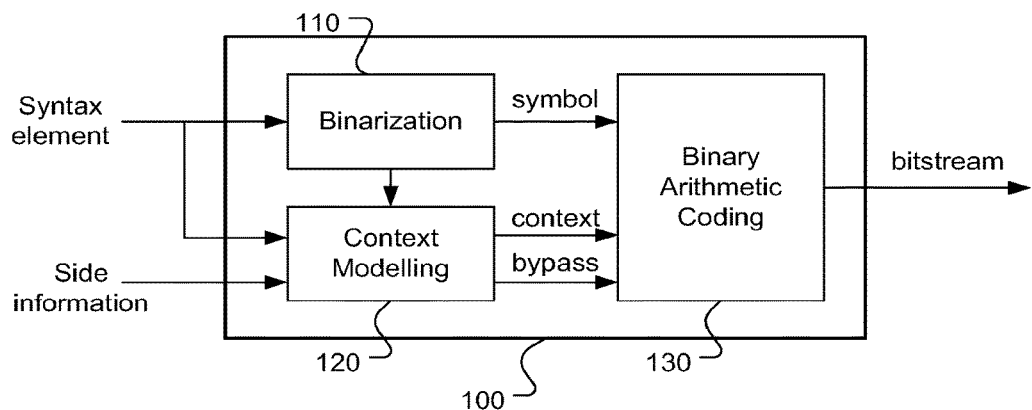
FIG. 1 illustrates exemplary architecture of CABAC encoding system with the bypass mode.

As described earlier, the use of contexts for syntax element coding requires additional memory and results in higher complexity. Embodiments of the present invention reduce the number of contexts by using the bypass mode for at least one bin, by sharing a context by more than one bin, or both.

For example, when the syntax element merge_idx is coded, the bins for merge_idx shown in Table 1 will be processed using contexts. The bin location is indicated by binIdx, where binIdx is from 0 to 3 for merge_idx. In conventional CABAC for merge_idx, one context is used for each bin. Embodiments according to the present invention can use the bypass mode for at least one bin, share a context by more than one bin to reduce the total number of contexts, or do both. When the bypass mode is used, the bypass mode can be applied to a bin or bins with binIdx belonging to a set, where the set consists of 1, 2, or 3 alone, or any combination of them. In other words, the set may be {1}, {2}, {3}, {1,2}, {1,3}, {2,3} or {1,2,3}. For example, the bypass mode can be applied to a bin or bins with binIdx belonging to {3}, {2,3} or {1,2,3} in various embodiments. When the context sharing mode is used, a context may be shared by 2 or more bins. For example, a common context may be shared by bins with binIdx belonging to {2,3} or {1,2,3} in various embodiments.

The context simplification method described above for the syntax element merge_idx reduces the number of contexts and consequently reduces storage and complexity. The impact on system performance in terms of BD-rate is negligible, where BD-rate is a coding quality measure widely used in the field of video coding.

In another example, the context simplification method according to the present invention is applied to the syntax element ref_idx_1c/ref_idx_10/ref_idx_11. The binarization of the syntax element ref_idx_1c/ref_idx_10/ref_idx_11 is shown in Table 2. The bin location is indicated by binIdx, where binIdx can be 0, 1, 2, . . . , N−1 for ref_idx_1c/ref_idx_10/ref_idx_11, where (N+1) is an integer related to the maximum number of reference pictures allowed in a list. In the conventional CABAC for ref_idx_1c/ref_idx_10/ref_idx_11, one context is used for each bin. Embodiments according to the present invention use the bypass mode for at least one bin or share a context by more than one bin to reduce the total number of contexts. When the bypass mode is used, the bypass mode can be applied to a bin or bins with binIdx belonging to a set, where the set consists of 1, 2, . . . , N−2, or N−1 alone, or any combination of them. For example, the bypass mode can be applied to a bin or bins with binIdx belonging to {i; 2≤i≤(N−1)} or {i; 1≤i≤(N−1)} in various embodiments. When the context sharing mode is used, a common context may be shared by 2 or more bins. For example, a common context may be shared by bins with binIdx belonging to {2,3, . . . , N−1} or {3, . . . , N−1} in various embodiments.

The context simplification method described above for the syntax element ref_idex_1c/ref_idx_10/ref_idx_11 can reduce the number of contexts and consequently reduce storage and complexity. The impact on system performance in terms of BD-rate is negligible.

In yet another example, the context simplification method according to the present invention is applied to the syntax element pred_type. The binarization of the syntax element pred_type is shown in Table 3. The bin location is indicated by binIdx, where binIdx is from 0 to 4 for pred_type. In the conventional CABAC for pred_type, one context is used for each bin. Embodiments according to the present invention can use the bypass mode for at least one bin or share a context by more than one bin to reduce the total number of contexts. When the bypass mode is used, the bypass mode can be applied to a bin or bins with binIdx belonging to a set, where the set consists of 1, 2, 3, or 4 alone, or any combination of them. For example, the bypass mode can be applied to a bin or bins with binIdx belongs to {4}, {3,4} or {2,3,4} in various embodiments. When the context sharing mode is used, a common context may be shared by 2 or more bins. For example, a context may be shared by bins with binIdx belonging to {2,3}, {3,4} or {2,3,4} in various embodiments.

The context simplification method described above for the syntax element pred_type can reduce the number of contexts and consequently reduce storage and complexity. The impact on system performance in terms of BD-rate is negligible.

In HEVC, the syntax element merge_flag is also encoded using CABAC. The syntax element merge_flag has one bin. An embodiment according to the present invention may use the bypass mode for the bin instead of using a context.

In a further example, the context simplification method according to the present invention is applied to the syntax element cu_qp_delta. The binarization of the syntax element cu_qp_delta is shown in the exemplary pseudo code described earlier. Bin 0 corresponds to the information associated with "whether abs(deltaQP) is greater than 0", where deltaQP is the difference between a current QP value and a previous QP value and abs( ) is the absolution value function. Bin 1 corresponds to the information associated with "whether abs(deltaQP) is greater than 1". Bins with binIdx equal to 2 and larger are related to "abs(deltaQP)−1". The largest binIdx value (N−1) depends on the largest allowed abs(deltaQP)−1. In the conventional CABAC for cu_qp_delta, the first two bins of cu_qp_delta (i.e., binIdx=0 and 1) use two separate contexts for each bin, while other bins (i.e., binIdx≥2) share one common context. Embodiments according to the present invention can use the bypass mode for at least one bin or share a context by more than one bin to reduce the total number of contexts. When the bypass mode is used, the bypass mode can be applied to a bin or bins with binIdx belonging to a set, where the set consists of 1, 2, . . . , N−1 or any combination of them. For example, the bypass mode can be applied to bins with binIdx equal to 2 or larger according to one embodiment. The bypass mode can be applied to bins with binIdx equal to 1 or larger according to another embodiment. When the context sharing mode is used, a context may be shared by 2 or more bins. For example, a context may be shared by the bin with binIdx equal to 1 and bins with binIdx equal to 2 or larger according to one embodiment. In other words, bins with binIdx equal to 1 or larger share a common context. A context may be shared by bins with binIdx equal to n+1, n+2, . . . according to another embodiment, where n is an integer greater than 0. Bypass mode and context sharing may also be used jointly according to an embodiment of the present invention. For example, bins with binIdx in the range {m, . . . , n−1} can share the same context while bins with binIdx in the set {n, n+1, . . . } use the bypass mode, where m and n are integers, and (n−1)>m. Furthermore, multiple bin groups can share respective common contexts. For example, bins with binIdx in the range {m1, . . . , m2−1} share a first common context and bins with binIdx in the range {m2, . . . , m3−1} share a second common context, where m1, m2 and m3 are integers and m3>m2>m1.

Figure 2:
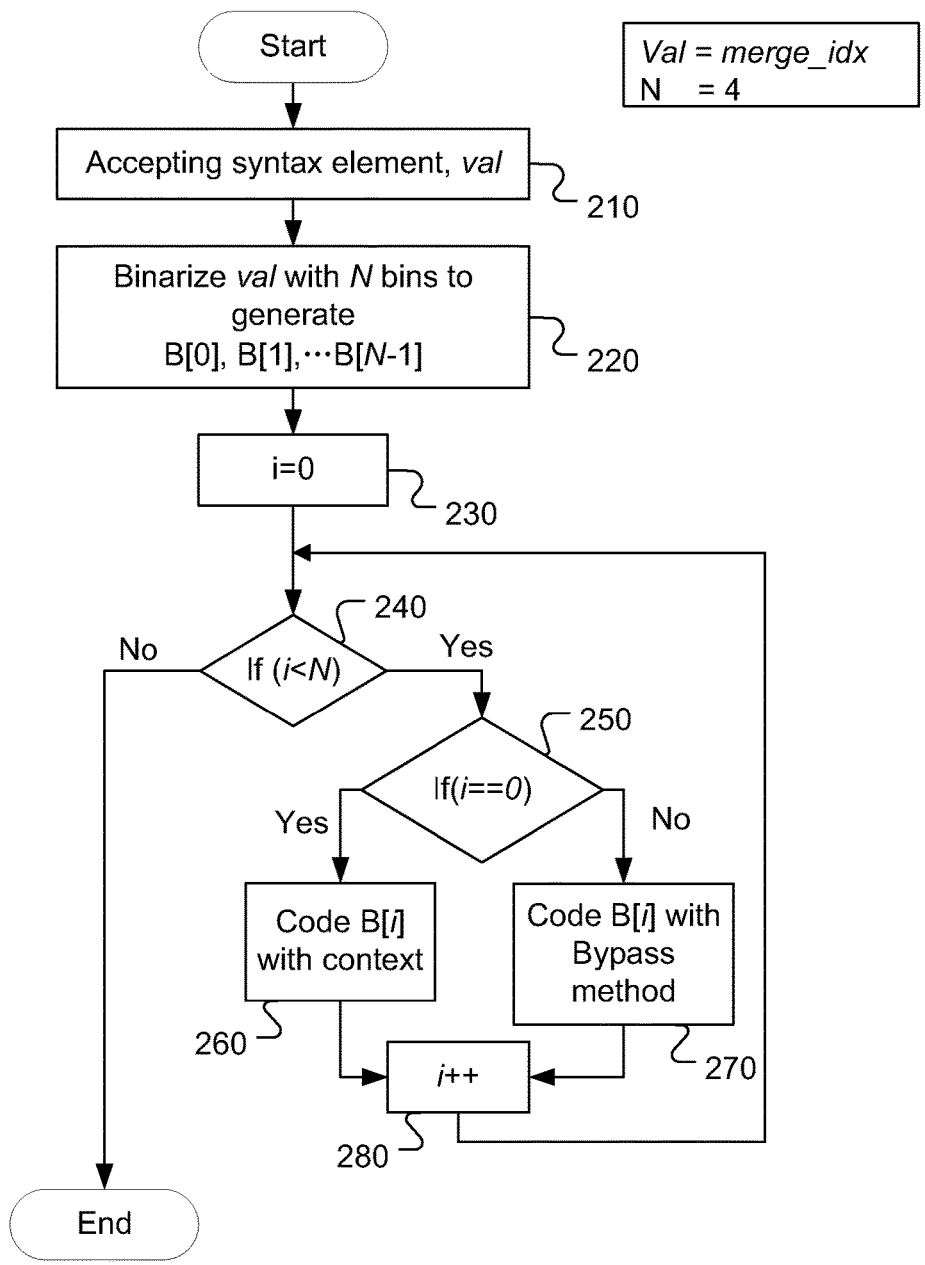
FIG. 2 illustrates an exemplary flow chart for context-adaptive arithmetic coding of merge_idx according to an embodiment of the present invention, where bins with binIdx equal to 1, 2 and 3 are coded in the bypass mode.

FIG. 2 illustrates an exemplary flowchart for a system incorporating context simplification according to an embodiment of the present invention. In this example, the bypass mode is applied to bins of the syntax element, merge_idx, where merge_idx is binarized into 4 bits. In step 210, the syntax element merge_idx is read into variable val. The variable val is then binarized into N bins: B[0], B[1], . . . B[N−1] in step 220. The counter i is initialized to 0 in step 230. The counter i is checked in step 240 to determine whether all bins have been processed. If all bins have been processed, the procedure is terminated (i.e., the "No" path). Otherwise, the counter i is checked (i.e., the "Yes" path) to see whether it is equal to 0 in step 250. If i is equal to 0, the bin is coded using context as shown in step 260; otherwise the bin is coded in the bypass mode as shown in step 270. The counter i is then incremented in step 280 and the process goes back to step 240 to process the next bin. Accordingly, the flowchart in FIG. 2 will cause the bin with binIdx equal to 0 to be coded using context and bins with binIdx in {1,2,3} to be coded in the bypass mode.

Figure 3:
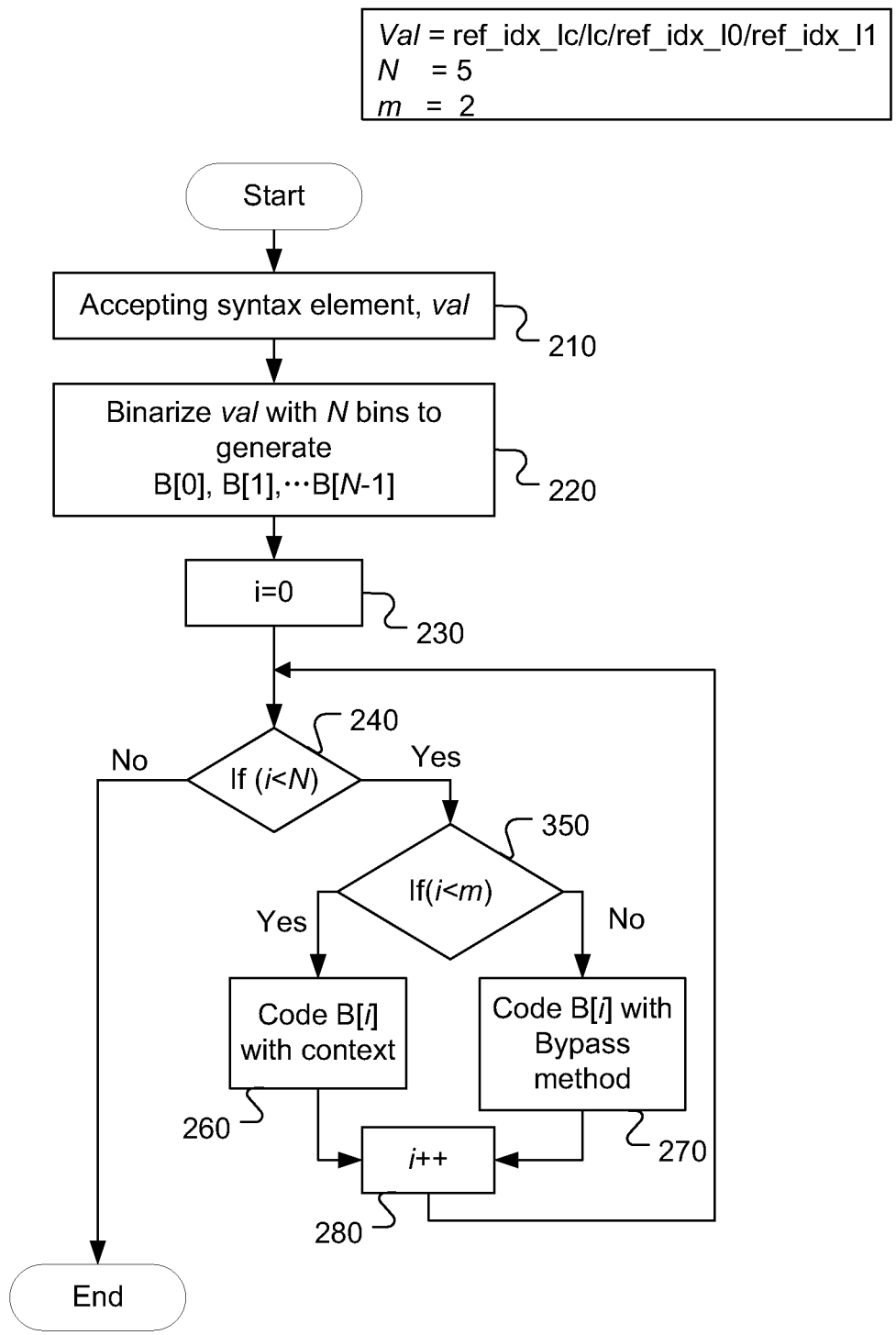
FIG. 3 illustrates an exemplary flow chart for context-adaptive arithmetic coding of ref_idx_1c/ref_idx_10/ref_idx_11 according to an embodiment of the present invention, where bins with binIdx equal to 2 or larger are coded in the bypass mode.

FIG. 3 illustrates another exemplary flowchart for a system incorporating context simplification according to an embodiment of the present invention. In this example, the bypass mode is applied to bins of the syntax element, ref_idx_1c/ref_idx_10/ref_idx_11, where ref_idx_1c/ref_idx_10/ref_idx_11 is binarized into 5 bits. The flowchart is substantially the same as the flowchart of FIG. 2 and the same steps are labeled with the same reference numbers. The syntax element ref_idx_1c/ref_idx_10/ref_idx_11 is read into the variable val as shown in step 210 and the variable val is binarized into N bins: B[0], B[1], ... B[N−1] in step 220, where N is 5. In step 350, the counter i is compared with an integer m (m=2). For 1=0 and 1, B[i] is coded using the context mode. For bins with binIdx in {2,3,4}, the bins are coded in the bypass mode.

FIG. 2 and FIG. 3 illustrate context coding simplification for syntax elements merge_idx and ref_idx_1c/ref_idx_10/ref_idx_11 respectively according to embodiments of the present invention. While specific syntax elements and parameters (such as number of bins, the bins selected for coding using the bypass mode) are used in the examples, a person skilled in the art may practice the present invention on other syntax elements and/or parameters. Furthermore, the steps shown in FIG. 2 and FIG. 3 may be re-arranged and some steps may be combined or split to practice the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of coding syntax elements, the method comprising:
  receiving a first syntax element, wherein the first syntax element represents a merge index associated with a coding unit;
  generating a first bin string corresponding to coding the first syntax element, wherein the first bin string includes a plurality of first bins and each first bin is associated with a respective bin index;
  coding the first bin string, including:
    applying a context-based adaptive binary arithmetic coding (CABAC) to a first portion of the plurality of first bins with bin indices belonging to a first index set using a bypass mode, all bin indices in the first index set being greater than a first predetermined number; and
  applying the CABAC to a second portion of the plurality of first bins with bin indices belonging to a second index set using a context mode, all bin indices in the second index set being not greater than the first predetermined number;
  receiving a second syntax element, wherein the second syntax element represents a reference picture index associated with the coding unit;
  generating a second bin string corresponding to coding the second syntax element, wherein the second bin string includes a plurality of second bins and each second bin is associated with a respective bin index;
  coding the second bin string, including:
    applying the CABAC to a first portion of the plurality of second bins with bin indices belonging to a third index set using the bypass mode, all bin indices in the third index set being greater than a second predetermined number; and
    applying the CABAC to a second portion of the plurality of second bins with bin indices belonging to a fourth index set using the context mode, all bin indices in the fourth index set being not greater than the second predetermined number;
  receiving a third syntax element, wherein the third syntax element represents a delta of quantization parameter associated with the coding unit;
  generating a third bin string corresponding to coding the third syntax element, wherein the third bin string includes a plurality of third bins and each third bin is associated with a respective bin index; and
  coding the third bin string, including:
    applying the CABAC to a first portion of the plurality of third bins with bin indices belonging to a fifth index set using the bypass mode, all bin indices in the fifth index set being greater than a third predetermined number; and
    applying the CAB AC to a second portion of the plurality of third bins with bin indices belonging to a sixth index set using the context mode, all bin indices in the sixth index set being not greater than the third predetermined number,
wherein a common context is used for at least two of the third bins with the bin indices belonging to the sixth index set.

2. An apparatus for coding syntax elements, the apparatus comprising:
   circuitry configured to:
      receive a first syntax element, wherein the first syntax element represents a merge index associated with a coding unit;
      generate a first bin string corresponding to coding the first syntax element, wherein the first bin string includes a plurality of first bins and each first bin is associated with a respective bin index;
      code the first bin string, including:
         apply a context-based adaptive binary arithmetic coding (CABAC) to a first portion of the plurality of first bins with bin indices belonging to a first index set using a bypass mode, all bin indices in the first index set being greater than a first predetermined number; and
         apply the CABAC to a second portion of the plurality of first bins with bin indices belonging to a second index set using a context mode, all bin indices in the second index set being not greater than the first predetermined number;
      receive a second syntax element, wherein the second syntax element represents a reference picture index associated with the coding unit;
      generate a second bin string corresponding to coding the second syntax element, wherein the second bin string includes a plurality of second bins and each second bin is associated with a respective bin index;
      code the second bin string, including:
         apply the CABAC to a first portion of the plurality of second bins with bin indices belonging to a third index set using the bypass mode, all bin indices in the third index set being greater than a second predetermined number; and
         apply the CABAC to a second portion of the plurality of second bins with bin indices belonging to a fourth index set using the context mode, all bin indices in the fourth index set being not greater than the second predetermined number;
      receive a third syntax element, wherein the third syntax element represents a delta of quantization parameter associated with the coding unit;
      generate a third bin string corresponding to coding the third syntax element, wherein the third bin string includes a plurality of third bins and each third bin is associated with a respective bin index; and
      code the third bin string, including:
         apply the CABAC to a first portion of the plurality of third bins with bin indices belonging to a fifth index set using the bypass mode, all bin indices in the fifth index set being greater than a third predetermined number; and
         apply the CAB AC to a second portion of the plurality of third bins with bin indices belonging to a sixth index set using the context mode, all bin indices in the sixth index set being not greater than the third predetermined number,
   wherein a common context is used for at least two of the third bins with the bin indices belonging to the sixth index set.

* * * * *